(12) United States Patent
Sajadieh et al.

(10) Patent No.: US 9,277,588 B2
(45) Date of Patent: Mar. 1, 2016

(54) MOBILE TERMINAL ARCHITECTURE FOR DUAL PERSONALITY WIRELESS DEVICES

(75) Inventors: Masoud Sajadieh, Fremont, CA (US); Andreas Schmidt, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,310

(22) PCT Filed: Mar. 14, 2012

(86) PCT No.: PCT/US2012/029039
§ 371 (c)(1),
(2), (4) Date: Aug. 1, 2014

(87) PCT Pub. No.: WO2013/137872
PCT Pub. Date: Sep. 19, 2013

(65) Prior Publication Data
US 2014/0349633 A1 Nov. 27, 2014

(51) Int. Cl.
*H04W 4/00* (2009.01)
*H04W 88/06* (2009.01)
*H04W 8/18* (2009.01)
*H04L 29/08* (2006.01)

(52) U.S. Cl.
CPC .............. *H04W 88/06* (2013.01); *H04W 4/001* (2013.01); *H04W 4/003* (2013.01); *H04W 8/18* (2013.01); *H04W 8/183* (2013.01); *H04L 67/306* (2013.01)

(58) Field of Classification Search
CPC ............ H04W 76/021; H04W 76/022; H04W 76/025; H04W 88/06; H04W 8/18; H04W 8/183; H04W 28/24; H04W 4/001; H04W 4/003; H04L 12/4641; H04L 12/4633; H04L 45/302; H04L 47/2408
See application file for complete search history.

(56) References Cited

U.S. PATENT DOCUMENTS 8,085,891 B2 * 12/2011 Owen ........................... 375/354
2006/0010314 A1 1/2006 Xu
2007/0288921 A1 12/2007 King et al.
(Continued)

FOREIGN PATENT DOCUMENTS

| CN | 104206000 A | 12/2014 |
|---|---|---|
| EP | 2848085 A | 3/2015 |
| WO | WO-2013/085541 A1 | 6/2013 |
| WO | WO-2013137872 A1 | 9/2013 |

OTHER PUBLICATIONS

"International Application Serial No. PCT/US2012/029039, Search Report mailed Nov. 29, 2012", 4 pgs.
(Continued)

*Primary Examiner* — Diane Mizrahi
(74) *Attorney, Agent, or Firm* — Schwegman Lundberg & Woessner, P.A.

(57) ABSTRACT

Disclosed in some examples is a user-equipment including a transceiver; one or more processors configured to: provide a first mobile personality associated with a first mobile application executing on the one or more processors; provide a second mobile personality associated with a second mobile application executing on the one or more processors; and provide a first virtual mobile device associated with the first mobile personality and a second virtual mobile device associated with the second mobile personality, wherein the first and second virtual mobile devices provide independent connectivity to the first and second mobile applications via the transceiver.

19 Claims, 7 Drawing Sheets

(56) References Cited

U.S. PATENT DOCUMENTS

| | | |
|---|---|---|
| 2010/0306773 A1 | 12/2010 | Lee et al. |
| 2010/0333088 A1 | 12/2010 | Rogel et al. |
| 2012/0054853 A1 | 3/2012 | Gupta et al. |
| 2013/0232238 A1* | 9/2013 | Cohn et al. .................... 709/220 |
| 2014/0032691 A1* | 1/2014 | Barton et al. ................. 709/206 |
| 2014/0032758 A1* | 1/2014 | Barton et al. ................. 709/225 |

OTHER PUBLICATIONS

"International Application Serial No. PCT/US2012/029039, Written Opinion mailed Nov. 29, 2012", 7 pgs.

"Policy and Charging Control Architecture", 3GPP TS 23.203 V11.7.0, (Sep. 2012), 178 pgs.

"International Application Serial No. PCT/US2012/029039, International Preliminary Report on Patentability mailed Sep. 25, 2014", 9 pgs.

Barr K., et al., "The VMware mobile virtualization platform: Is that a hypervisor in your pocket?", ACM SIGOPS Operating Systems Review, vol. 44, pp. 124-135, Dec. 2010., 124-135.

"European Application Serial Appl. No. 12871564.6, Extended European Search Report mailed Oct. 9, 2015", 7 pgs.

Jeremy, Andrus, "Cells", Operating Systems Principles, Acm, 2 Penn Plaza, Suite 701 New York USA, (Oct. 23, 2011), 173-187.

* cited by examiner

MOBILE TERMINAL ARCHITECTURE FOR DUAL PERSONALITY WIRELESS DEVICES

PRIORITY CLAIM TO RELATED APPLICATIONS

This application is a national stage application under 35 U.S.C. §371 of PCT/US2012/029039, filed Mar. 14, 2012, and published as WO 2013/137872 on Sep. 19, 2013, which application and publication are incorporated by reference as if reproduced herein and made a part hereof in their entirety, and the benefit of priority of which is claimed herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Intel, Inc., All Rights Reserved.

BACKGROUND

Advancing wireless technology has delivered increased bandwidth and improved user experiences for mobile devices. This has enabled the proliferation of advanced mobile devices such as smartphones and tablets with advanced features such as web surfing, video streaming, and the like. Along with these advances, a new use case for these advanced devices has emerged which puts both corporate and personal data and applications on the same mobile device. This trend, called Bring Your Own Device (BYOD), promises to make working anywhere, anytime, and on any device a reality. This and other similar use cases share the common Multiple-Persona (MP) characteristic where the same physical device hosts applications and serves connectivity requirements of different personalities. A personality may be thought of as a particular configuration of software and data. For example, a business persona may have business applications and data associated with it, whereas a personal persona may have personal applications and data associated with it.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
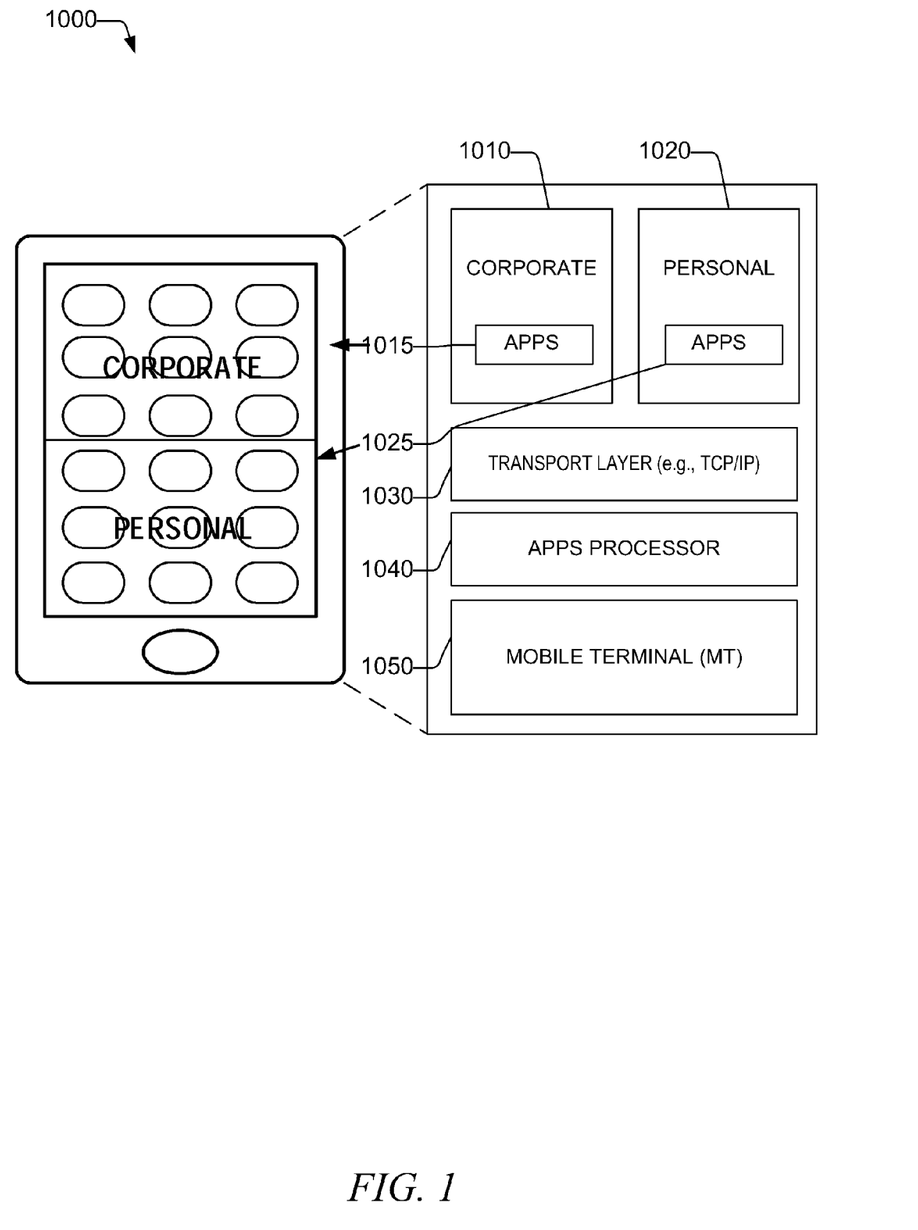
FIG. 1 shows an example of a mobile device with multiple personas according to some examples of the present disclosure.

FIG. 1 shows an example device 1000 hosting two separate personas 1010 and 1020. Device 1000 may be any type of mobile device capable of executing one or more applications and communicating with one or more wireless networks. For example, device 1000 may be a User Equipment (UE) operating in accordance with a 3rd Generation Partnership Project (3GPP) family of standards such as a Long Term Evolution (LTE) family of standards (e.g., 3GPP release 8 and later, first published 2008). Other example devices include smartphones, mobile phones, tablet personal computers, notebook or portable personal computers, personal computers, or the like operating in accordance with any number of wireless standards. The corporate persona 1010 has one or more associated applications 1015. The personal persona 1020 has one or more associated applications 1025. Each persona may share the transport layer services (e.g., Transport Control Protocol (TCP) and/or Internet Protocol (IP)) 1030. Apps processor 1040 provides hardware and software functionality to enable the execution of the various applications of the personas. For example, apps processor 1040 may include various computer processors for performing instructions. Example instructions included in apps processor 1040 may include an operating system which may provide to other applications an interface to access other hardware of the mobile device 1000 such as a display, the mobile terminal 1050, an input device, and the like. Mobile terminal 1050 may also be shared between personas and may include the cellular modem of the mobile device and the radio protocol stack. For example, the cellular modem and the radio protocol stack may include various functionality for enabling the mobile device to communicate across one or more mobile device networks such as a network in accordance with a 3rd Generation Partnership Project (3GPP) Long Term Evolution family of standards or a network in accordance with a Universal Mobile Telecommunications (UMTS) family of standards.

A device such as shown in FIG. 1 which hosts multiple personas presents challenges related to the security and connectivity of the personas. One such challenge is that data from one persona may need to be isolated from the data from other personas so that only authorized persons and applications may access particular data. For example, particular applications on the personal persona should be prevented from monitoring and/or accessing data from a corporate persona. This may prevent malicious or even accidental disclosures of sensitive material. Another challenge is that from a connectivity perspective, concurrent connections of different personalities with their own prescribed Quality-of-Service (QoS) requirements to potentially different packet domains may be desired. This will allow each persona to maintain separate and concurrent connections to disparately terminated IP locations. Thus a business persona may have a connection to a business virtual private network and a personal persona may have a concurrent connection with the Internet. These connections are separately setup, terminated, and managed. This is challenging with traditional devices which treat the networking components (e.g., the connectivity or modem engine) as a black box.

Figure 2:
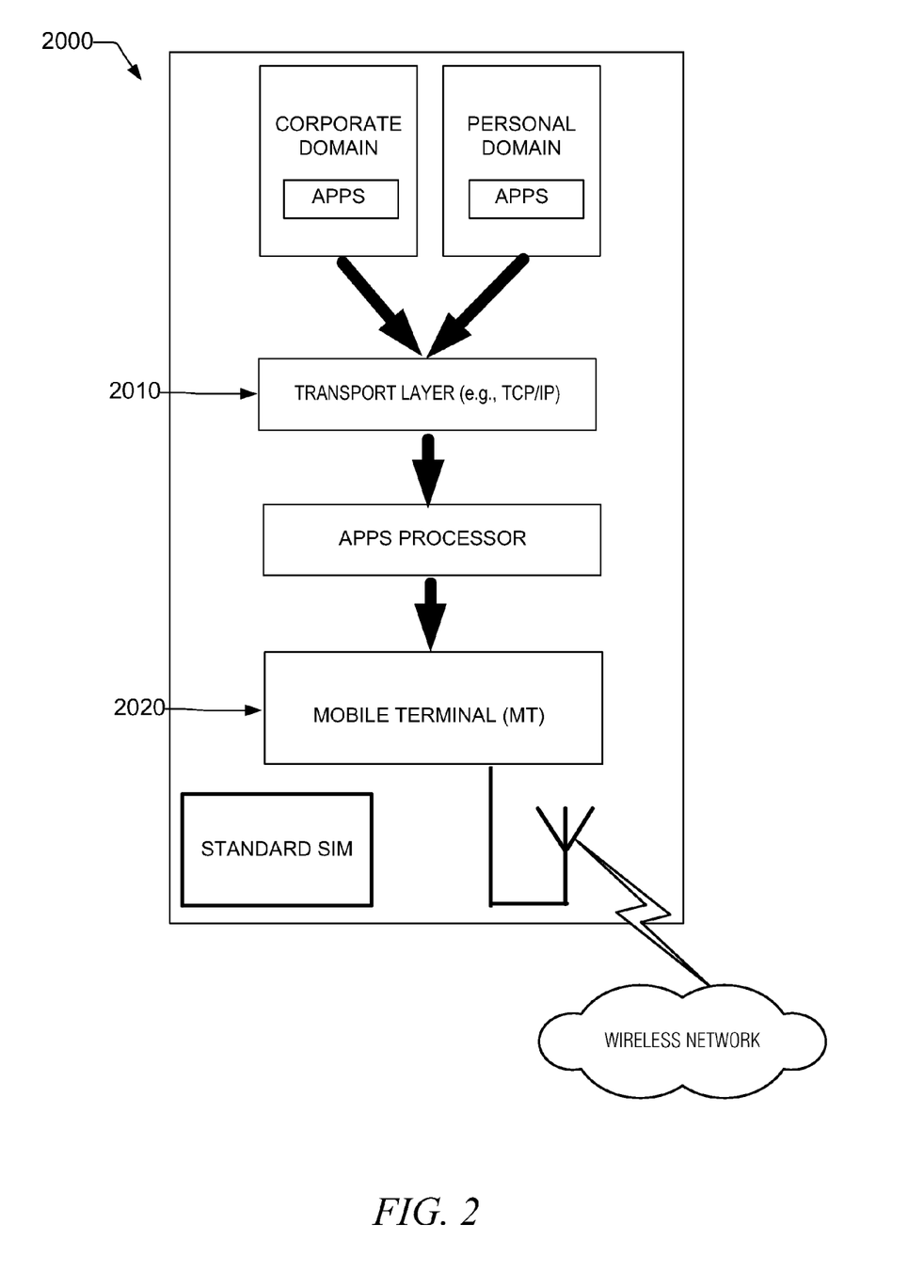
FIG. 2 shows an example of a data flow of a mobile device with multiple personas according to some examples of the present disclosure.

One solution to the problem of multiple persona devices is illustrated by the data flow 2000 in FIG. 2, which is to treat the networking components of the mobile (e.g., transport layer 2010, mobile terminal 2020) as a black box and focus efforts on securing data between the various personas. These solutions do not allow for differentiating QoS requirements, or independently managed connections as the mobile terminal is not MP aware.

Disclosed in some examples is a multi-persona aware mobile device architecture which provides concurrent and independent connectivity as well as independent prioritization for multiple personas of a mobile device. This may be achieved by defining a plurality of virtual mobile devices. Each virtual mobile device may include independent IP connectivity to the packet domain which may enable each virtual mobile to create, modify, and release connections independent of other virtual mobiles. This may be particularly useful when one of the personalities terminates at a non-public IP network whereas traffic belonging to another personality may connect to the public Internet. Additionally, each individual persona may have its own quality of service prioritization. Thus certain personas may have preference over other personas. All the personas may share the same single transceiver and utilize the same International Mobile Subscriber Identity (IMSI) on the same Subscriber Identity Module (SIM). In some examples the SIM card is MP aware in that the SIM may store a particular profile for a particular persona.

The MP aware mobile device may operate in accordance with one or more wireless standards. For example, the MP aware mobile device may be a User Equipment (UE) operating in accordance with a 3rd Generation Partnership Project (3GPP) family of standards such as a Long Term Evolution (LTE) family of standards, an High Speed Packet Access (HSPA) family of standards (e.g., 3GPP release 5 and later, first published 2002), a Universal Mobile Telecommunications System (UMTS) family of standards (e.g., 3GPP release 99 and later, first published 2000), or any wireless standard.

This architecture allows MP aware mobiles to utilize a single transceiver and a single SIM while allowing for independent connectivity and independent QoS for a secure MP system. This solution only requires a change at the mobile device and may not require changes in the network infrastructure components (e.g., a Node B or an eNodeB in the example of 3GPP network standards).

Figure 3:
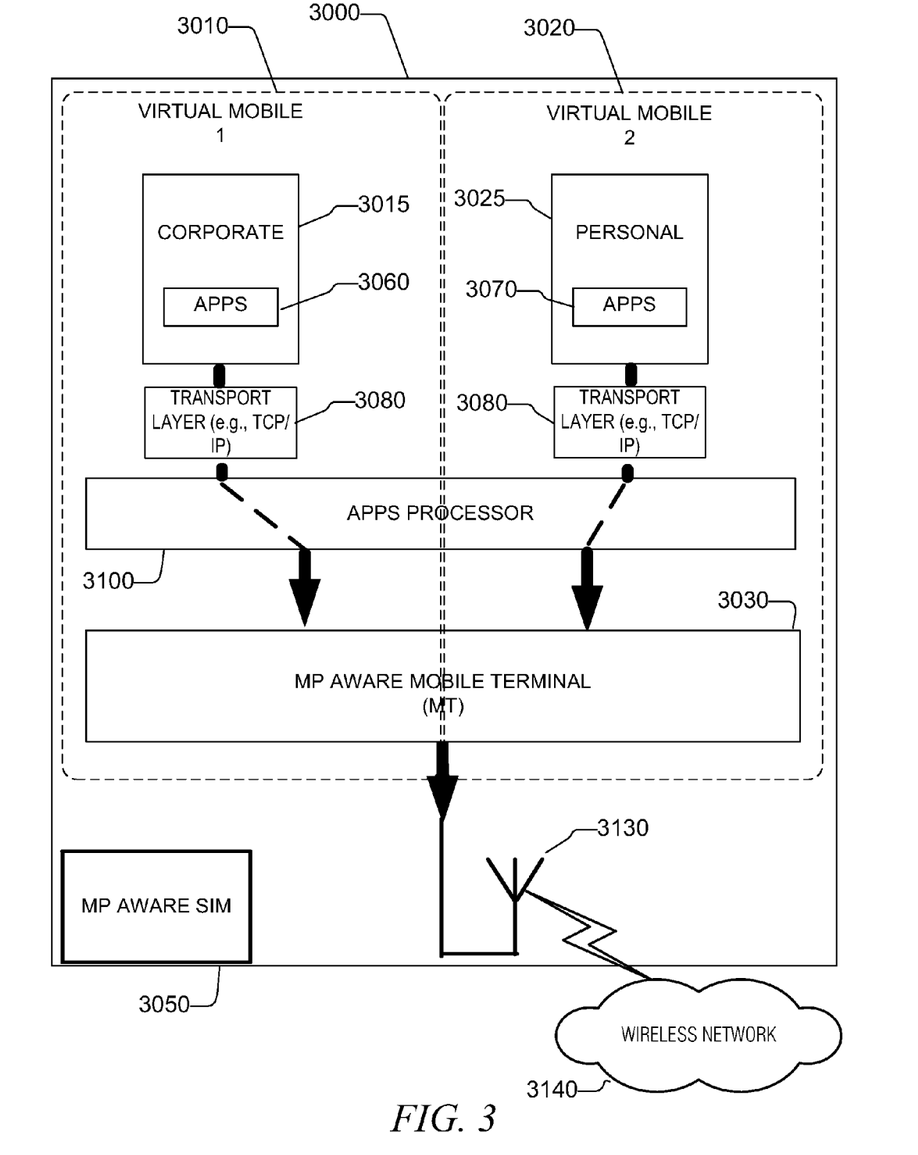
FIG. 3 shows an example of a data flow of a multiple persona aware mobile device according to some examples of the present disclosure.

FIG. 3 shows one example data flow of a mobile device 3000 employing the MP-aware mobile architecture. Two virtual mobiles 3010 and 3020 are defined which are associated with two different personas 3015 and 3025. The MP-aware mobile architecture features one MP aware mobile terminal 3030 and an MP aware SIM 3050. Applications in a first persona 3060 (e.g., a corporate persona) and applications with a second persona 3070 may utilize different TCP/IP layers 3080. In other examples, Transport layer 3080 may be the same transport layer, but the single transport layer may be an MP aware transport layer capable of separating and processing multiple data flows with different IP addresses from disparate personalities simultaneously. Apps processor 3100 provides hardware and software functionality to enable the execution of the various applications of the personas. For example, apps processor 3100 may include various computer processors for performing instructions. Example instructions included in apps processor 3100 may include an operating system which may provide to other applications an interface to access other hardware of the mobile device 3000 such as a display, the mobile terminal 3030, an input device, and the like. The mobile device 3000 may include one or more antennas 3130 (multiple antennas may be utilized in order to support Multiple Input, Multiple Output techniques) which transmit signals generated from the MP aware mobile terminal 3030 across the wireless network 3140.

Figure 4:
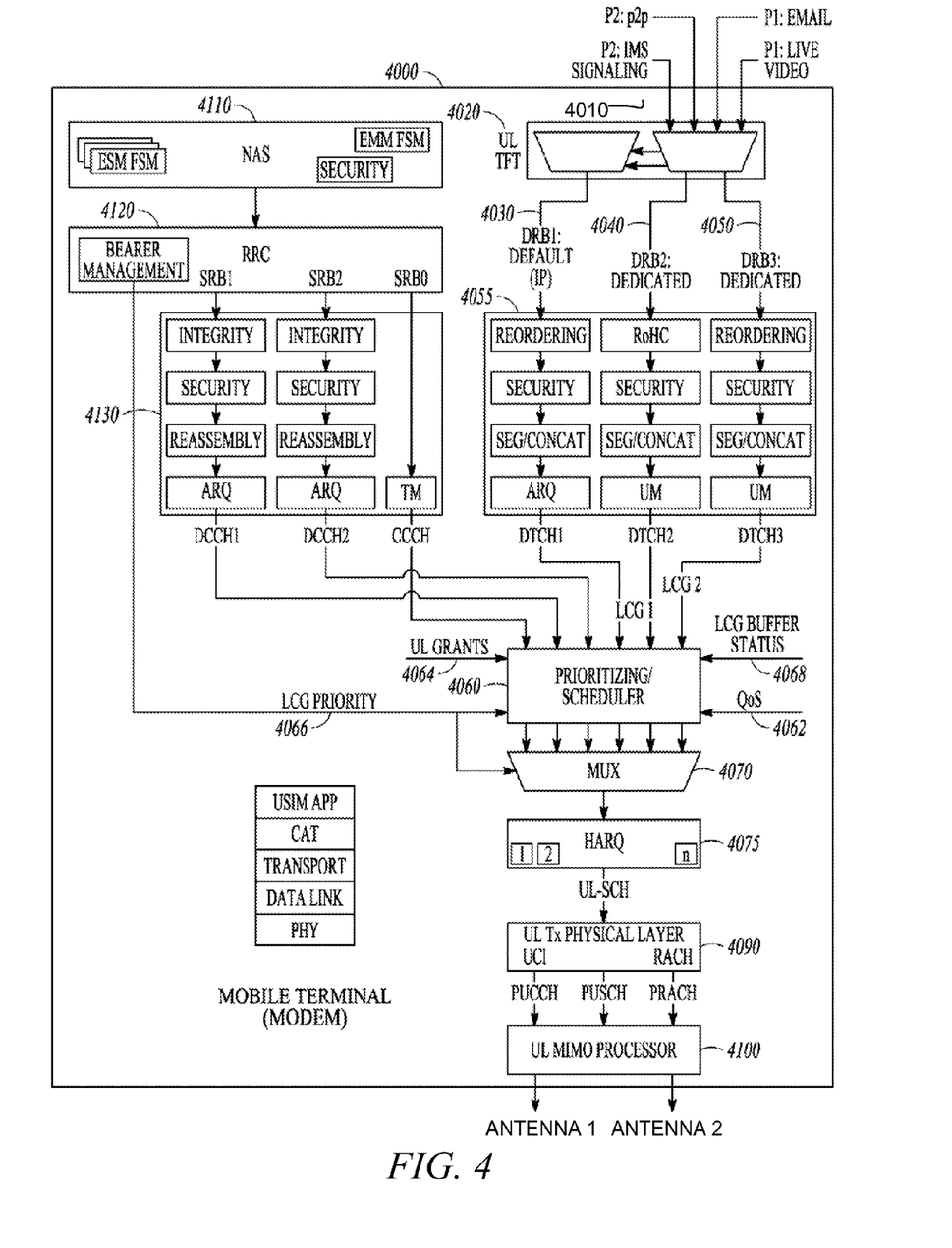
FIG. 4 shows an example of a block diagram of a mobile device according to some examples of the present disclosure.

A block diagram of a traditional, non-mp aware mobile terminal 4000 according to a 3GPP family of standards is shown in FIG. 4. In the example of FIG. 4, four data streams 4010 are defined for two different personas. For persona 1, there is a conversational live video and email data stream and for persona 2 there is IP Multimedia Subsystem (IMS) signaling and peer-to-peer (p2p) file streaming data streams. These multiple data flows 4010 from multiple persona of the mobile are routed into one or more uplink traffic flow templates (TFT) 4020. TFTs are a set of all packet filters associated with an Evolved Packet System (EPS) bearer. An EPS bearer uniquely identifies traffic flows that receive a common QoS treatment between a mobile terminal (e.g., a User Equipment (UE) from a 3GPP family of standards) and a Packet Data Network Gateway (PDN GW) in a core network of the wireless network. Each TFT has one or more radio bearers 4030-4050 associated with it. Each data radio bearer (DRB) transmits the packets of an EPS bearer between the mobile device and a base station of the wireless network. There is one default radio bearer 4030 which is an IP radio bearer which carries IP traffic associated with a single IP address. Each radio bearer is reordered, has security applied, is concatenated or segmented, and has automatic repeat request (ARQ) processing or is processed in unacknowledged mode (UM) by a data processing module 4055. In some examples, the packets may be compressed (RoHC). These radio bearers are then mapped along with control channels from the control plane onto a number of traffic channels (DTCH1-3) and then scheduled and prioritized by the prioritizing/scheduler component 4060 which factors in QoS information 4062, uplink grant information from the network 4064, priority information 4066, and Logical Channel Group (LCG) buffer status 4068. Scheduled packets are then multiplexed by the MUX component 4070 and then run through one of the HARQ processes represented by the HARQ component 4075. In some examples, the DTCH traffic channels may be grouped into a Logical Channel Grouping (LCG). Logical channel groups are intended to simplify resource allocation and reporting mechanisms in the MAC layer. The UE will report buffer status based on the logical channel groups, rather than the individual bearers, and will use the UL grant to transmit data for the bearers in the corresponding group as it sees fit. The separation of bearers into different LCGs may be based largely on the QoS characteristics of the bearers; bearers with the same QoS needs will typically be in the same logical channel group. Packets are then sent over the air by the uplink transmit physical layer 4090 and may be transmitted using Multiple Input Multiple Output techniques across multiple antennae using UL MIMO Processor 4100. In some examples, the packets may be scheduled on the Uplink Shared logical channel (UL-SCH). The logical channels are then placed onto various physical channels such as the physical uplink control channel, the physical uplink shared channel and the physical random access channel.

On the control plane, the Non-Access Stratum (NAS) 4110 manages mobility support of the mobile and supports session management procedures, establishment and maintenance of IP connectivity between the mobile and the packet network. It accomplishes these functions through the EPS mobility management finite state machine (EMM FSM), and the EPS session management finite state machine. The Radio Resource Control (RRC) 4120 provides for the reception and processing of system information related to the non-access stratum (NAS) layer, reception and process of system information related to the access stratum (AS), paging, establishment, maintenance and release of RRC connections between the mobile device and the wireless network, security functions including key management, establishment, configuration, maintenance and release of point to point radio bearers, mobility functions, QoS management functions, measurement reporting and NAS message transfer to/from NAS and to/from the mobile device.

RRC data is placed onto a plurality of Signaling Radio Bearers (SRB) which are processed 4130 (e.g., by reassembly, integrity protection, security protection, and ARQ processes) and then placed on a number of logical control channels (Dedicated and Common Control Channels DCCH and CCCH). These channels are prioritized and scheduled by the prioritizing scheduler 4060, then Multiplexed by the MUX 4070, then processed by one of the HARQ processes of the HARQ component 4075 and then mapped onto physical channels for transmission.

Figure 5:
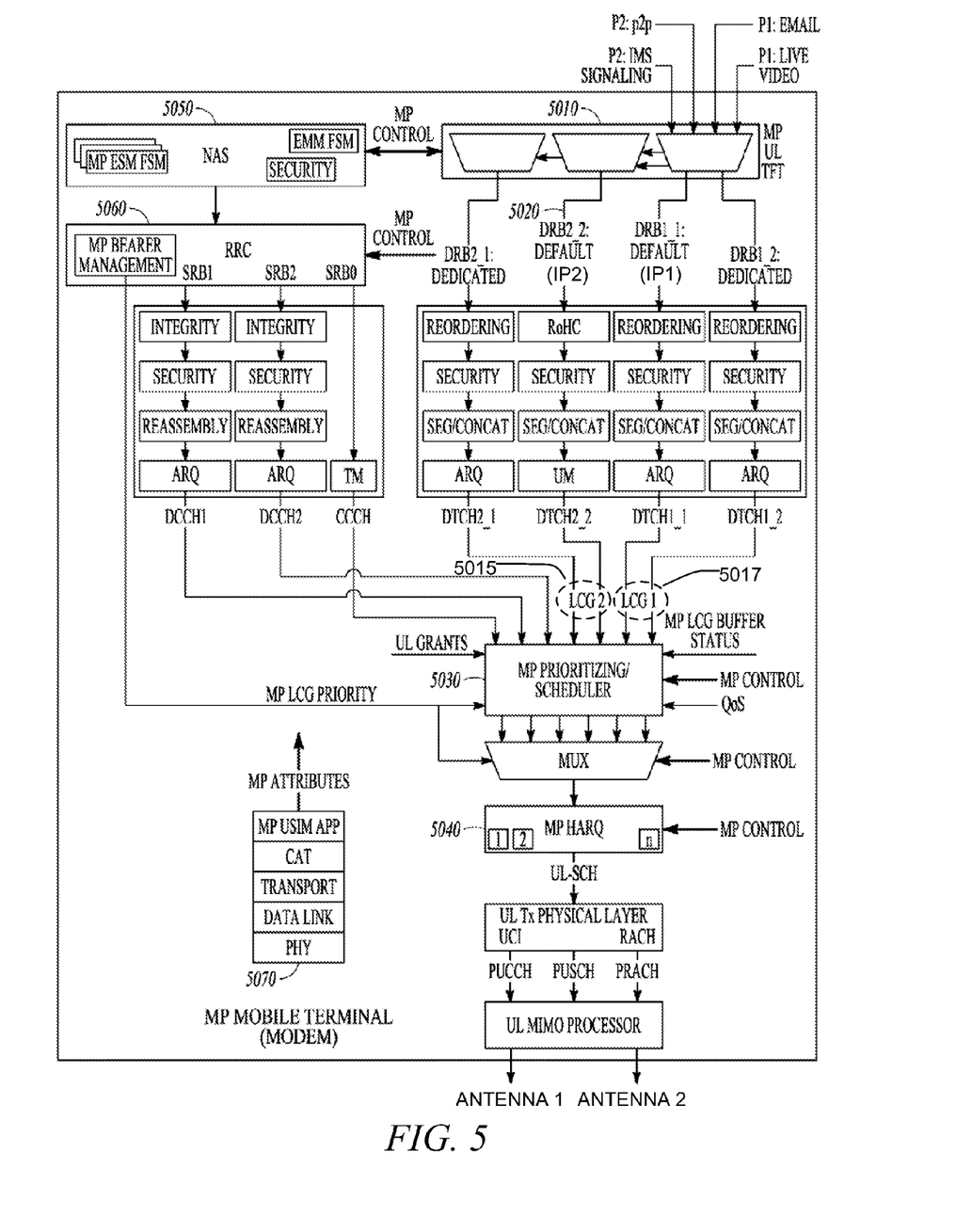
FIG. 5 shows an example of a block diagram of a multiple persona aware mobile device according to some examples of the present disclosure.

FIG. 5 shows an MP aware mobile device according to some examples of the present disclosure and according to a 3GPP family of standards. MP aware components are labeled as "MP." One or more additional MP aware UL TFT 5010 may be defined to handle additional personas which may result in the allocation of additional Radio Data Bearers with additional IP bearing default RDB such as RDB 5020. Each personality may have its own default IP bearer toward the particular network it is associated or connected with. The MP UL TFT may be MP aware and may bind incoming service data flows (SDF) to appropriate default and dedicated bearers to achieve this. Outgoing data bearers are all MP, which is distinct from FIG. 4, where SDFs of different persona can be merged into a single radio bearer. In other words, MP TFT prevents binding different data flows across the persona. In some examples, one or more Logical Channel Groups (LCG) 5015, 5017 may be formed from the radio bearers of the same persona in the MP mobile case. This will facilitate Buffer Status Reports (BSR) to reflect the data availability of different persona separately. BSRs are inputs to the Uplink scheduler in both the network side (e.g., eNodeB) and the mobile side (e.g., UE). The architecture of FIG. 4, being MP unaware, may group the logical channels of different personas together. This may prevent prioritizing traffic based on personas.

MP prioritizing/scheduler 5030 is MP aware in that it may prioritize data from particular personas differently by scheduling some packets from some personas ahead of other personas. The MP prioritizing/scheduler 5030 may factor in QoS requirements of personas as well as the QoS requirements of different applications within a persona. The HARQ control process 5040 is also MP aware and may prioritize HARQ processes to the traffic of a single persona. The control plane (NAS 5050 and RRC layers 5060) is also MP aware in order to setup and manage the additional bearers. Bearer management (activation/modification and release) in the RRC will be driven in part based on the requirements of the personalities. The EPS session management (ESM) procedures within the NAS layer 5050 may also take into account the multiple personality dimension of the mobile device. In some examples, this may be accomplished by utilizing a joint Finite State Machine (FSM) implementation of the ESM as opposed to the per-bearer FSM of FIG. 4. Finally, the SIM card 5070 is MP aware in that it contains profiles which contain information used to manage and setup the multiple personas of the wireless device. Inserting the MP SIM card 5070 in a different wireless device will instruct the device to create the MP framework as defined in the various persona profiles.

All the various MP aware processes utilize MP control information provided by other layers to inform them about QoS requirements for each persona, bearer and connection status, and the like.

The unique MP aware solution disclosed enables for the provisioning of one or more virtual mobile devices which act as independent radios, each independently managing the connectivity of their respective personalities. These virtual mobiles feature concurrent operation whereby any of the personalities may become active at the same time to communicate with their respective IP domains, but utilizing a single transceiver and a single IMSI for all virtual mobile devices. These virtual mobiles also enjoy independent IP connectivity to their respective packet domains enabling them to create, modify, and release their connections independently. Each virtual mobile may have different QoS requirements.

While the examples presented herein focused on wireless networks and mobile devices implemented based on a 3GPP family of standards such as Long Term Evolution (LTE), High Speed Packet Access (HSPA), and Universal Mobile Telecommunications Standard (UMTS), one skilled in the art with the benefit of Applicant's disclosure will appreciate that the systems, methods, machine readable mediums and apparatuses described herein may apply to other wireless networks. Examples include (but are not limited to), Wi-Fi networks according to an IEEE 802.11 family of standards (e.g., 802.11n-2009, published 2009), Wi-Max networks according to an IEEE 802.16 family of standards (e.g., such as 802.16e-2009, published 2009), or any other wireless transmission and reception system.

Example Machine

Figure 6:
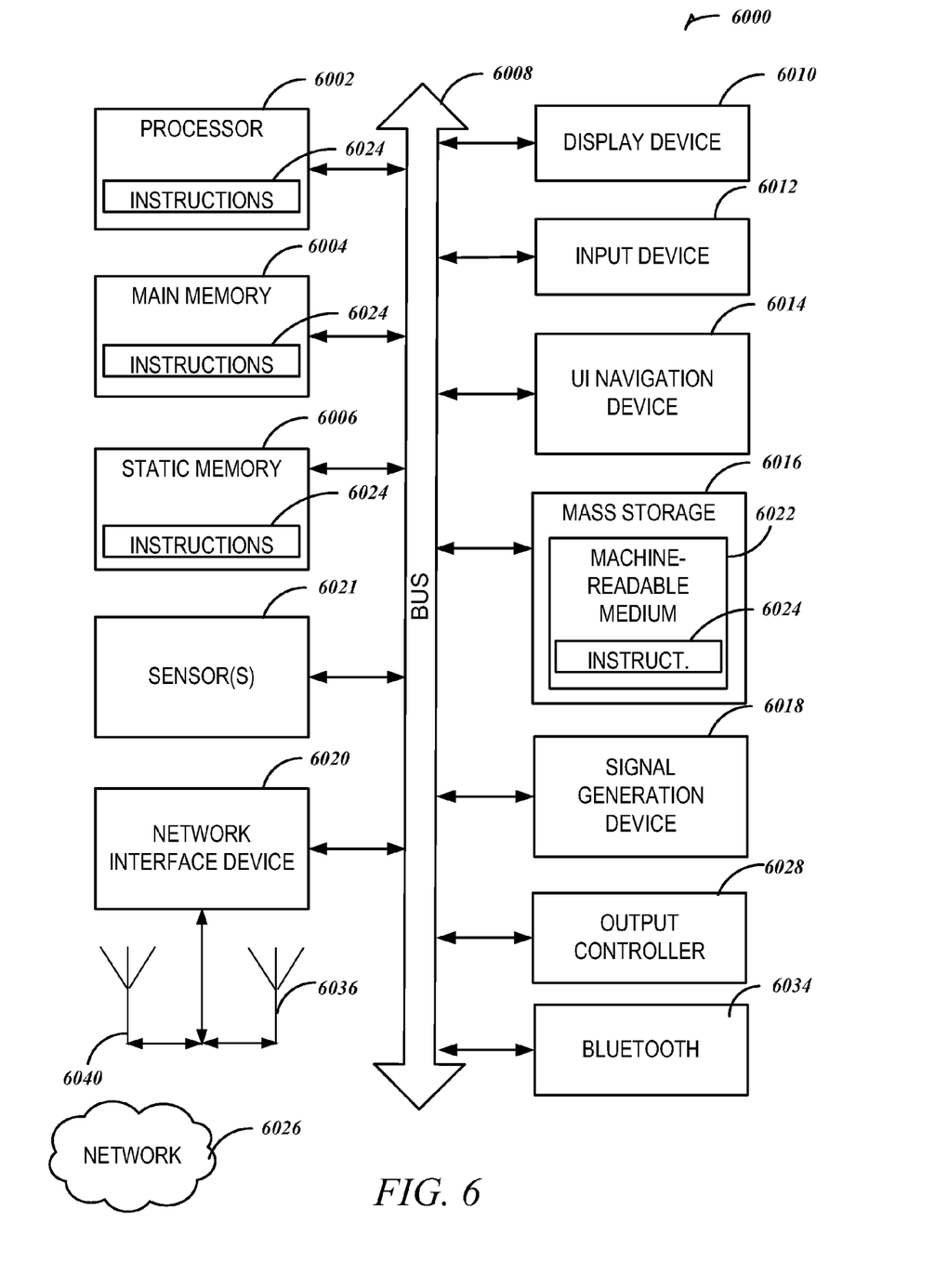
FIG. 6 shows an example block diagram of a machine according to some examples of the present disclosure.

FIG. 6 illustrates a block diagram of an example machine 6000 upon which any one or more of the techniques (e.g., methodologies) discussed herein can be performed. The mobile device may be or include one or more components of machine 6000. In various embodiments, the machine 6000 can operate as a standalone device or can be connected (e.g., networked) to other machines. In a networked deployment, the machine 6000 can operate in the capacity of a server machine, a client machine, or both in server-client network environments. In an example, the machine 6000 can act as a peer machine in peer-to-peer (P2P) (or other distributed) network environment. The machine 6000 can be a personal computer (PC), a tablet PC, a set-top box (STB), a Personal Digital Assistant (PDA), a mobile telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. For example, the functions of the machine 6000 can be distributed across multiple other machines in a network.

Examples, as described herein, can include, or can operate on, logic or a number of components, modules, or mechanisms. Modules are tangible entities capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as one or more modules that can change over time. Software can accordingly configure a hardware processor, for example, to constitute a particular module at one instance of time and to constitute a different module at a different instance of time. Or to constitute one or more modules at the same time.

Machine (e.g., computer system) 6000 can include a hardware processor 6002 (e.g., a central processing unit (CPU), a graphics processing unit (GPU), a hardware processor core, or any combination thereof), a main memory 6004 and a static memory 6006, some or all of which can communicate with each other via a bus 6008. The machine 6000 can further include a display unit 6010, an alphanumeric input device 6012 (e.g., a keyboard), and a user interface (UI) navigation device 6011 (e.g., a mouse). In an example, the display unit 6010, input device 6017 and UI navigation device 914 can be a touch screen display. The machine 6000 can additionally include a storage device (e.g., drive unit) 6016, a signal generation device 6018 (e.g., a speaker), a network interface device 6020, and one or more sensors 6021, such as a global positioning system (GPS) sensor, compass, accelerometer, or other sensor. The machine 6000 can include an output controller 6028, such as a serial (e.g., universal serial bus (USB), parallel, or other wired or wireless (e.g., infrared (IR)) connection to communicate or control one or more peripheral devices (e.g., a printer, card reader, etc.).

The storage device 6016 can include a machine-readable medium 6022 on which is stored one or more sets of data structures or instructions 6024 (e.g., software) embodying or utilized by any one or more of the techniques or functions described herein. The instructions 6024 can also reside, completely or at least partially, within the main memory 6004, within static memory 6006, or within the hardware processor 6002 during execution thereof by the machine 6000. In an example, one or any combination of the hardware processor 6002, the main memory 6004, the static memory 6006, or the storage device 6016 can constitute machine readable media.

While the machine-readable medium 6022 is illustrated as a single medium, the term "machine readable medium" can include a single medium or multiple media (e.g., a centralized or distributed database, and/or associated caches and servers) that configured to store the one or more instructions 6024.

The term "machine-readable medium" can include any tangible medium that is capable of storing, encoding, or carrying instructions for execution by the machine 6000 and that cause the machine 6000 to perform any one or more of the techniques of the present disclosure, or that is capable of storing, encoding or carrying data structures used by or associated with such instructions. Non-limiting machine-readable medium examples can include solid-state memories, and optical and magnetic media. Specific examples of machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 6024 can further be transmitted or received over a communications network 6026 using a transmission medium via the network interface device 6020. Network interface device 6020 may connect the machine 6000 to a network of other machines in order to communicate with the other machines in the network by utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks) such as a Long Term Evolution (LTE) network, Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 6020 can include one or more physical jacks (e.g., Ethernet, coaxial, or phone jacks) or one or more antennas to connect to the communications network 6026. In an example, and as shown in FIG. 5, the network interface device 6020 can include a plurality of antennas, for example, 6036 and 6040, to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 6000, and includes digital or analog communications signals or other intangible medium to facilitate communication of such software.

Example Wireless Network

Figure 7:
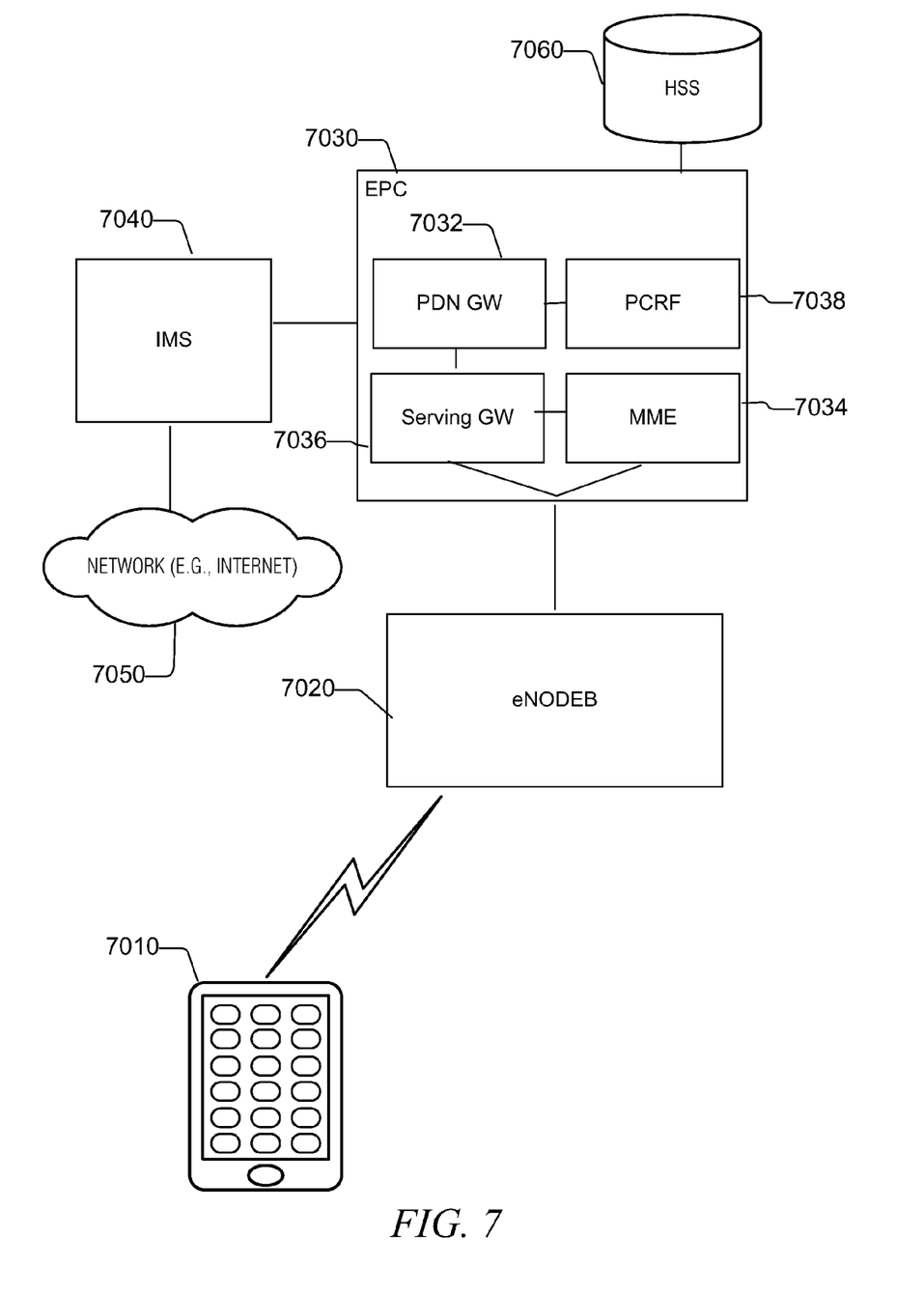
FIG. 7 shows an example wireless network according to some examples of the present disclosure.

FIG. 7 shows an example wireless network implemented in accordance with a Long Term Evolution (LTE) family of standards. Mobile device or user equipment (UE) 7010 communicates with an eNodeB 7020 over an air interface. UE 7010 may be a MP aware UE in accordance with the present disclosure. The eNodeB supports all Layer 1, Layer 2, and Layer 3 (Radio Resource Control—RRC) features associated with the Orthogonal Frequency Division Multiplexing (OFDM) protocol used to communicate with the UE 7010 over the air interface. This includes modulation/demodulation, channel coding/decoding, radio resource control, radio mobility management, and other functions. The eNodeB 7020 is further connected to an Evolved Packet Core (EPC) 7030 comprised of one or more Mobility Management Entities 7034, serving gateway (SGW) 7036, and the Packet Data Network gateway 7032. The EPC may also have other components (not shown) including components for setting policies and for billing, as well as components utilized to enable voice calling. MME 7034 controls the control plane functions related to subscriber and session management. Serving Gateway 7036 serves as a mobility anchor which routes packets from mobiles for mobility within the network 7000. The PDN gateway 7032 is the termination point of the packet data interface towards the Packet Data Network. The PDN gateway 7032 may be connected to an Internet Protocol Multimedia Subsystem (IMS) 7040 which may provide access to one or more public networks, such as the Internet, 7050. Policy and Charging Rules Function (PCRF) component 7038 manages the policies, QoS information, and other system policies. Home Subscriber Server (HSS) 7060 maintains and manages user identification and addressing, user profile information, authentication of users, ciphering and integrity protection, and other functions. HSS 7060 is shown as separate from EPC 7030, but in other examples it may be part of the EPC 7030. The various components of network 7000 may be or include various components of machine 6000 or additional components such as RF transceivers/receivers, amplifiers, or the like.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The following are additional examples:

Example 1

A user-equipment with a transceiver and one or more processors configured to provide a first mobile personality associated with a first mobile application executing on the one or more processors; provide a second mobile personality associated with a second mobile application executing on the one or more processors; and provide a first virtual mobile device associated with the first mobile personality and a second virtual mobile device associated with the second mobile personality, wherein the first and second virtual mobile devices provide independent connectivity to the first and second mobile applications via the transceiver.

Example 2

The user equipment according to example 1, where the first and second virtual devices utilize a single International Mobile Subscriber Identity number.

Example 3

The user equipment according to any one of examples 1 or 2, where the first and second virtual mobile devices obtain independent internet protocol addresses.

Example 4

The user equipment according to any one of examples 1-3, where the first and second virtual mobile devices obtain independent user data bearers.

Example 5

The user equipment according to any one of examples 1-4, wherein the first virtual mobile device utilizes a first set of quality of service requirements and the second virtual mobile device utilizes a second set of quality of service requirements, the first and second set of quality of service requirements being distinct.

Example 6

The user equipment according to any one of examples 1-5, wherein the mobile device includes a hybrid automatic repeat request controller which is configured to pre-empt a first data bearer associated with the first mobile personality in response to a greater precedence for the second mobile personality.

Example 7

The user equipment according to any one of examples 1-6, including a subscriber identity module which provides a first profile associated with the first mobile personality and a second profile associated with the second mobile personality.

Example 8

A method including executing a first mobile application on a processor of a user equipment, the first mobile application associated with a first personality; executing a second mobile application concurrently with the first mobile application on the processor of the user equipment, the second mobile application associated with a second personality; and providing a first virtual mobile device associated with the first mobile personality and a second virtual mobile device associated with the second mobile personality, wherein the first and second virtual mobile devices provide independent quality of service requirements to the first and second mobile personalities for data sent over a wireless network.

Example 9

The method according to example 8, where sending data over a wireless network includes sending the data in accordance with a Long Term Evolution family of standards.

Example 10

The method according to any one of examples 8 or 9, where the first and second mobile personalities provide independent connectivity to the first and second mobile applications.

Example 11

The method according to any one of examples 8-10, including obtaining independent user data bearers for the first and second virtual mobile devices.

Example 12

The method according to any one of examples 8-11, including obtaining independent internet protocol addresses for the first and second virtual mobile devices.

Example 13

The method according to any one of examples 8-12, including pre-empting a first data bearer associated with the first mobile personality in response to a greater precedence for the second mobile personality at a hybrid automatic repeat request controller.

Example 14

The method according to any one of examples 8-13, including providing a first profile associated with the first mobile personality and a second profile associated with the second mobile personality on a subscriber identity module.

Example 15

A machine readable medium that stores instructions which when performed by a machine, cause the machine to perform certain operations including: providing a first mobile personality associated with a first mobile application executing on the processor; providing a second mobile personality associated with a second mobile application executing on the processor; and providing a first virtual mobile device associated with the first mobile personality and a second virtual mobile device associated with the second mobile personality, wherein the first and second virtual mobile devices provide independent connectivity to the first and second mobile applications via a transceiver and utilize a single International Mobile Subscriber Identity number.

Example 16

The machine-readable medium according to example 15, where the instructions comprise instructions, which when executed, cause the processor to perform the operations of: forming a first logical channel from traffic flows associated only with the first persona and forming a second logical channel from traffic flows associated only with the second persona.

Example 17

The machine-readable medium according to any one of examples 15 or 16, wherein the instructions includes instructions, which when executed, cause the processor to perform the operations of: providing buffer status reports to a base station, wherein the buffer status reports specify a buffer status for each of the particular personas.

Example 18

The machine-readable medium according to any one of examples 15-17 where the first and second virtual mobile devices utilize independent internet protocol addresses.

Example 19

The machine-readable medium according to any one of examples 15-18, where the first and second virtual mobile devices utilize independent user data bearers.

Example 20

The machine-readable medium according to any one of examples 15-19, wherein the first virtual mobile device utilizes a first set of quality of service requirements and the second virtual mobile device utilizes a second set of quality of service requirements, the first and second set of quality of service requirements being distinct.

Example 21

The machine-readable medium according to any one of examples 15-20, wherein the instructions include instructions which when performed by the machine, cause the machine to provide a hybrid automatic repeat request controller which is configured to pre-empt a first data bearer associated with the first mobile personality in response to a greater precedence for the second mobile personality.

Example 22

The machine-readable medium according to any one of examples 15-21, wherein the instructions include instructions which when performed by the machine, cause the machine to provide a first profile associated with the first mobile personality and a second profile associated with the second mobile personality.

What is claimed is:
1. A user-equipment comprising:
a transceiver;
one or more processors configured to:
provide a first mobile personality associated with a first mobile application executing on the one or more processors;
provide a second mobile personality associated with a second mobile application executing on the one or more processors; and
provide a first virtual mobile device associated with the first mobile personality and a second virtual mobile device associated with the second mobile personality, wherein the first and second virtual mobile devices provide independent connectivity to the first and second mobile applications via the transceiver, and wherein the first and second virtual mobile devices obtain independent user data bearers.

2. The user-equipment of claim 1, wherein the first and second virtual devices utilize a single International Mobile Subscriber Identity number.

3. The user-equipment of claim 1, wherein the first and second virtual mobile devices obtain independent internet protocol addresses.

4. The user-equipment of claim 1, wherein the first virtual mobile device utilizes a first set of quality of service requirements and the second virtual mobile device utilizes a second set of quality of service requirements, the first and second set of quality of service requirements being distinct.

5. The user-equipment of claim 1, wherein the user-equipment includes a hybrid automatic repeat request controller which is configured to pre-empt a first data bearer associated with the first mobile personality in response to a greater precedence for the second mobile personality.

6. The user-equipment of claim 1, comprising a subscriber identity module which provides a first profile associated with the first mobile personality and a second profile associated with the second mobile personality.

7. A method comprising:
executing a first mobile application on a processor of a user equipment, the first mobile application associated with a first personality;
executing a second mobile application concurrently with the first mobile application on the processor of the user equipment, the second mobile application associated with a second personality;
providing a first virtual mobile device associated with the first mobile personality and a second virtual mobile device associated with the second mobile personality, wherein the first and second virtual mobile devices provide independent quality of service requirements to the first and second mobile personalities for data sent over a wireless network; and
obtaining independent user data bearers for the first and second virtual mobile devices.

8. The method of claim 7, wherein sending data over a wireless network comprises sending the data in accordance with a Long Term Evolution family of standards.

9. The method of claim 7, wherein the first and second mobile personalities provide independent connectivity to the first and second mobile applications.

10. The method of claim 7, comprising obtaining independent internet protocol addresses for the first and second virtual mobile devices.

11. The method of claim 7, comprising pre-empting a first data bearer associated with the first mobile personality in response to a greater precedence for the second mobile personality at a hybrid automatic repeat request controller.

12. The method of claim 7, comprising providing a first profile associated with the first mobile personality and a second profile associated with the second mobile personality on a subscriber identity module.

13. A non-transitory machine readable medium that stores instructions which when performed by a machine, cause the machine to perform operations comprising:
providing a first mobile personality associated with a first mobile application executing on the processor;
providing a second mobile personality associated with a second mobile application executing on the processor; and
providing a first virtual mobile device associated with the first mobile personality and a second virtual mobile device associated with the second mobile personality, wherein the first and second virtual mobile devices provide independent connectivity to the first and second mobile applications via a transceiver and utilize a single International Mobile Subscriber Identity number, and wherein the first and second virtual mobile devices utilize independent user data bearers.

14. The machine-readable medium of claim 13, wherein the instructions comprise instructions, which when executed, cause the processor to perform the operations of: forming a first logical channel from traffic flows associated only with the first persona and forming a second logical channel from traffic flows associated only with the second persona.

15. The machine-readable medium of claim 14, wherein the instructions comprise instructions, which when executed, cause the processor to perform the operations of: providing buffer status reports to a base station, wherein the buffer status reports specify a buffer status for each of the particular personas.

16. The machine-readable medium of claim 13, wherein the first and second virtual mobile devices utilize independent internet protocol addresses.

17. The machine-readable medium of claim 13, wherein the first virtual mobile device utilizes a first set of quality of service requirements and the second virtual mobile device utilizes a second set of quality of service requirements, the first and second set of quality of service requirements being distinct.

18. The machine-readable medium of claim 13, wherein the instructions include instructions which when performed by the machine, cause the machine to provide a hybrid automatic repeat request controller which is configured to pre-empt a first data bearer associated with the first mobile personality in response to a greater precedence for the second mobile personality.

19. The machine-readable medium of claim 13, wherein the instructions include instructions which when performed by the machine, cause the machine to provide a first profile associated with the first mobile personality and a second profile associated with the second mobile personality.

* * * * *